(12) United States Patent
Justice et al.

(10) Patent No.: US 8,961,302 B2
(45) Date of Patent: Feb. 24, 2015

(54) GAME BROWSING

(75) Inventors: John Raymond Justice, Bellevue, WA (US); Alex Aben-Athar Kipman, Redmond, WA (US); Kenneth Alan Lobb, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 13/554,215

(22) Filed: Jul. 20, 2012

(65) Prior Publication Data
US 2014/0024457 A1    Jan. 23, 2014

(51) Int. Cl.
*A63F 9/24* (2006.01)

(52) U.S. Cl.
USPC .............................................. 463/29; 463/42

(58) Field of Classification Search
USPC ....................................................... 463/29, 42
See application file for complete search history.

(56) References Cited

U.S. PATENT DOCUMENTS

| | | | |
|---|---|---|---|
| 6,377,257 B1 | 4/2002 | Borrel et al. | |
| 6,884,172 B1 | 4/2005 | Lloyd et al. | |
| 8,038,535 B2 | 10/2011 | Jensen | |
| 8,151,199 B2 | 4/2012 | Gerson et al. | |
| 8,176,437 B1 * | 5/2012 | Taubman | 715/810 |
| 8,264,493 B2 | 9/2012 | Peterfreund | |
| 8,668,582 B1 | 3/2014 | Overton | |
| 2004/0003039 A1 | 1/2004 | Humphrey | |
| 2004/0030882 A1 * | 2/2004 | Forman | 713/100 |
| 2004/0082388 A1 | 4/2004 | Simsek et al. | |
| 2004/0135805 A1 | 7/2004 | Gottsacker et al. | |
| 2004/0193813 A1 * | 9/2004 | Nguyen et al. | 711/156 |
| 2007/0173325 A1 | 7/2007 | Shaw et al. | |
| 2007/0195097 A1 | 8/2007 | Heesemans | |
| 2007/0232396 A1 | 10/2007 | Yoo | |
| 2008/0207322 A1 | 8/2008 | Mizrahi | |
| 2009/0094600 A1 | 4/2009 | Sargaison et al. | |
| 2009/0111576 A1 | 4/2009 | Ostergren et al. | |
| 2009/0118019 A1 | 5/2009 | Perlman et al. | |

(Continued)

FOREIGN PATENT DOCUMENTS

| | | |
|---|---|---|
| EP | 1640047 A1 | 3/2006 |
| EP | 1779909 A2 | 5/2007 |

(Continued)

OTHER PUBLICATIONS

PCT Search Report dated Oct. 31, 2013 re PCT/US2013/055234, 9 pages.

(Continued)

*Primary Examiner* — Steve Rowland
(74) *Attorney, Agent, or Firm* — Timothy Churna; Leonard Smith; Micky Minhas

(57) ABSTRACT

Embodiments of the present invention allow players to instantly access and begin playing games through an online service. To make the games instantly available, an online service keeps instances of games running in active memory waiting for a player to be added. The game instances running in active memory are not attached to a player profile or an I/O channel from a game client. Once the player requests a game, the player's player profile is loaded into the running game instance and an I/O channel is mapped from the game client to the game instance. From the player's perspective, the pre-loaded game instances allow the player to browse directly from game to game with very little delay. To optimize the usage of server-side resources, historical usage data may be analyzed to anticipate demand for different games.

20 Claims, 10 Drawing Sheets

(56) References Cited

U.S. PATENT DOCUMENTS

| | | | |
|---|---|---|---|
| 2009/0247295 A1 | 10/2009 | Weldon | |
| 2010/0304860 A1 | 12/2010 | Gault et al. | |
| 2010/0306813 A1 | 12/2010 | Perry et al. | |
| 2011/0025689 A1 | 2/2011 | Perez | |
| 2011/0145362 A1* | 6/2011 | Jones et al. | 709/217 |
| 2011/0225040 A1 | 9/2011 | Yerli | |
| 2012/0004039 A1 | 1/2012 | Perry et al. | |
| 2012/0004041 A1 | 1/2012 | Pereira et al. | |
| 2012/0004042 A1 | 1/2012 | Perry et al. | |
| 2012/0064976 A1 | 3/2012 | Gault et al. | |
| 2012/0072911 A1 | 3/2012 | Whaley et al. | |
| 2012/0299938 A1 | 11/2012 | Iwasaki | |
| 2013/0225287 A1* | 8/2013 | Bronstein Bendayan et al. | 463/31 |

FOREIGN PATENT DOCUMENTS

| | | |
|---|---|---|
| EP | 2340877 A3 | 11/2013 |
| EP | 2340878 A3 | 11/2013 |
| WO | 9932990 | 7/1999 |
| WO | 0136061 | 5/2001 |
| WO | 2005061068 A1 | 7/2005 |
| WO | 2007119236 | 10/2007 |
| WO | 2012107739 A3 | 10/2012 |
| WO | 2012166305 A1 | 12/2012 |
| WO | 2013006802 | 1/2013 |
| WO | 2013023069 | 2/2013 |

OTHER PUBLICATIONS

PCT App. No. PCT/US2013/051180, International Search Report and Written Opinion, dated Oct. 14, 2013, 13 pages.

Bhuvan Urgaonkar et al. Agile Dynamic Provisioning of Multi-Tier Internet Applications, ACM Transactions on Autonomous and Adaptive Systems, vol. 3, No. 1, Mar. 1, 2008, pp. 1-39, XP055081646.

Machida F et al., Just-In-Time Server Provisioning Using Virtual Machine Standby and Request Prediction, Autonomic Computing, 2008, ICAC, 08, International Conference on, IEEE, Piscataway, NJ USA, Jun. 2, 2008, pp. 163-171, XP031276805.

Shaikh A et al., On Demand Platform for Online Games, IBM Systems Jounral, IBM Corp., Armonk, New York, US, vol. 45, No. 1, Jan. 1, 2003, pp. 7-19, XP002492825.

"Components of a Multiplayer Game", Published on: Jul. 11, 2011, 7 pages, available at: http://www.jenkinssoftware.com/raknet/manual/multiplayergamecomponents.html.

Non-Final Office Action dated Feb. 5, 2014 re U.S. Appl. No. 13/593,843 (26 pages).

Notification of Transmittal of the International Search Report and the Written Opinion of the International Searching Authority, or the Declaration in PCT/US2013/76871 mailed Mar. 13, 2014, 11 pages.

PCT Search Report dated Mar. 27, 2014 re Appl. No. PCT/US2013/076918 (11 pages).

International Search Report with Written Opinion mailed Jul. 31, 2014 in Application No. PCT/US2014/022712, 11 pages.

International Search Report with Written Opinion mailed Aug. 5, 2014 in Application No. PCT/US2014/023096, 10 pages.

Non-Final Office Action dated Sep. 30, 2014 in U.S. Appl. No. 13/723,498, 12 pages.

Raghuraman et al "Immersive Multiplayer Tennis With Microsoft Kinect and Body Sensor Network" Published Oct. 29-Nov. 2, 2012, 4 pages.

Dance Central Game Manual released Nov. 4, 2010, 12 pages.

Final Office Action dated Sep. 29, 2014 in U.S. Appl. No. 13/593,843, 14 pages.

\* cited by examiner

GAME BROWSING

BACKGROUND

To switch to a new video game, media may need to be removed from a game console and new media inserted. Once the new media is inserted, the game may be loaded from passive or secondary memory (e.g., the game media) into the game console's active memory before the player is able to begin play. Currently, a similar process occurs with an online game service. Once the player makes a request to play a game through an online service, the servers that provide the online game service load an instance of the requested game from secondary storage into an active memory for the server. The player may then play once the game is in the active memory.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow players to instantly access and begin playing games through an online service. To make the games instantly available, the online service keeps instances of games running in active memory waiting for a player to be added. The game instances running in active memory are not attached to a player profile or an I/O channel from a game client. Once the player requests a game, the player's player profile is loaded into the running game instance and an I/O channel is mapped from the game client to the game instance. Thus, the game instance may be running without a player profile or I/O channel. The player profile may include a language packet that specifies the language in which game features should be presented. This allows a single preloaded game instance to accommodate different language needs.

From the player's perspective, the preloaded game instances allow the player to browse directly from game to game with very little delay. Instead of waiting for a game to be loaded into active memory, the player is dropped almost instantly into an active play state. This also allows a player to browse from game to game, similar to surfing between television channels. In one embodiment, the player is able to browse between full versions of games that they have purchased or have a license to play through a subscription to a game service. In another embodiment, the player is able to surf through game demos that may be limited to a particular level or set of features.

To optimize the usage of server-side resources, historical usage data may be analyzed to anticipate demand for different games. Games with higher demand may have more game instances ready for players to drop in. Games with less demand may have fewer active game instances running waiting for players to drop in. The number of instances of various games may be different based on the location of a particular server and the players serviced by the server.

BRIEF DESCRIPTION OF THE DRAWINGS

Embodiments of the invention are described in detail below with reference to the attached drawing figures, wherein.

DETAILED DESCRIPTION

Figure 1:
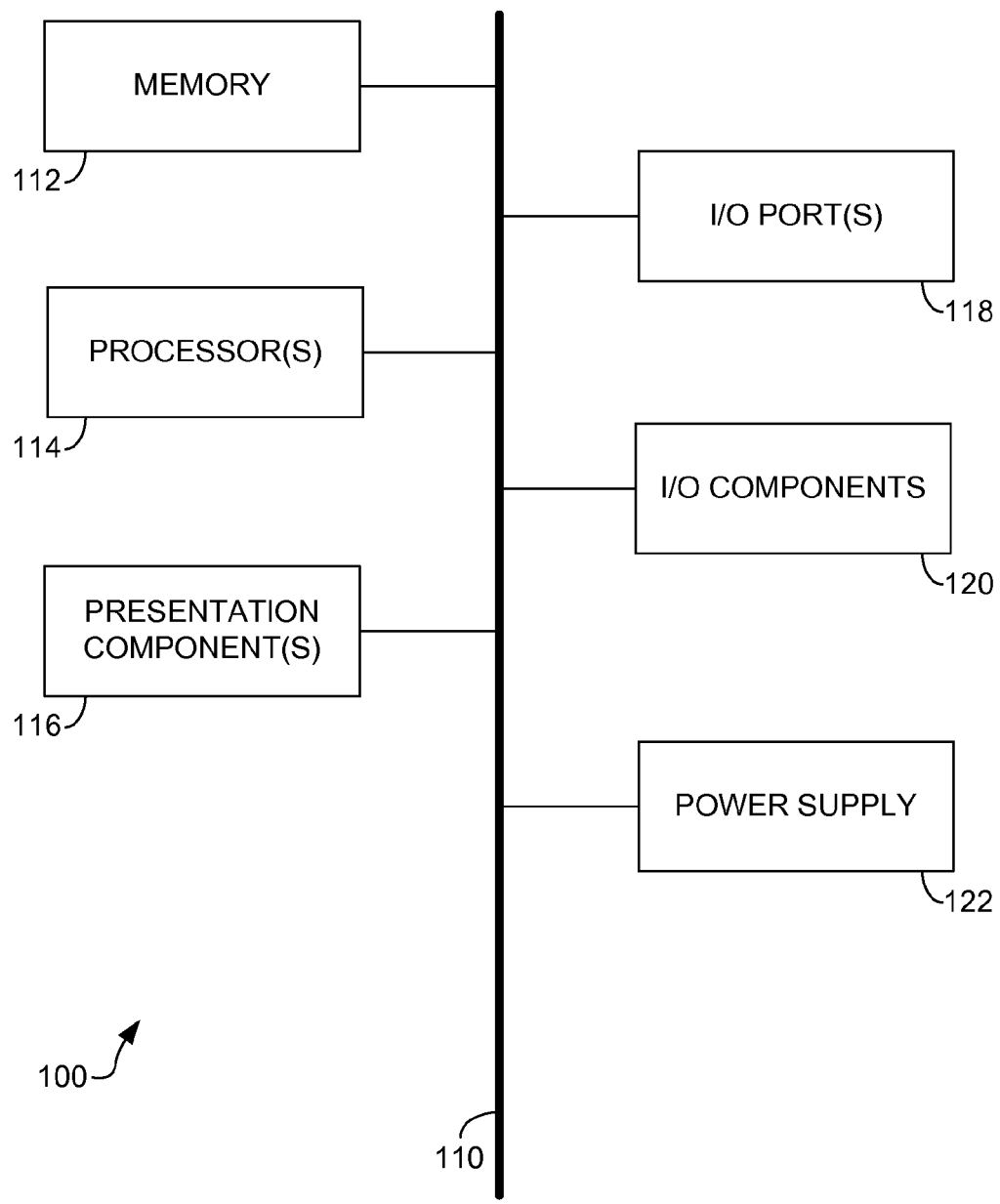
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might be embodied in other ways to include different steps or combinations of steps similar to the ones described in this document in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow players to instantly access and begin playing games through an online service. To make the games instantly available, the online service keeps instances of games running in active memory waiting for a player to be added. In a running state, the game objects in active memory are accessible and manipulable by a processing device that executes the game. Active memory contrasts with secondary memory in which game objects may be stored passively while they are not manipulable in a game action.

The game instances running in active memory are not attached to a player profile or an I/O channel from a game client. Once the player requests a game, the player's player profile is loaded into the running game instance and an I/O channel is mapped from the game client to the game instance. Thus, the game instance may be running without a player profile or I/O channel. The player profile may include a language packet that specifies the language in which game features should be presented. This allows a single preloaded game instance to accommodate different language needs.

From the player's perspective, the preloaded game instances allow the player to browse directly from game to game with very little delay. Instead of waiting for a game to be loaded into active memory, the player is dropped almost instantly into an active play state. This also allows a player to browse from game to game, similar to surfing between television channels. In one embodiment, the player is able to browse between full versions of games that they have purchased or have a license to play through a subscription to a game service. In another embodiment, the player is able to surf through game demos that may be limited to a particular level or set of features. When selecting only a single game, rather than switching between games, embodiments of the invention may be described as providing an instant-on experience for the user.

To optimize the usage of server-side resources, historical usage data may be analyzed to anticipate demand for different games. Games with higher demand may have more game instances ready for players to drop in. Games with less demand may have fewer active game instances running waiting for players to drop in. The number of instances of various games may be different based on the location of a particular server and the players serviced by the server.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a player or other device. Exemplary presentation components 116 include a display device, touch screen, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, touch screen, scanner, printer, wireless device, etc.

Exemplary Online Gaming Environment

Figure 2:
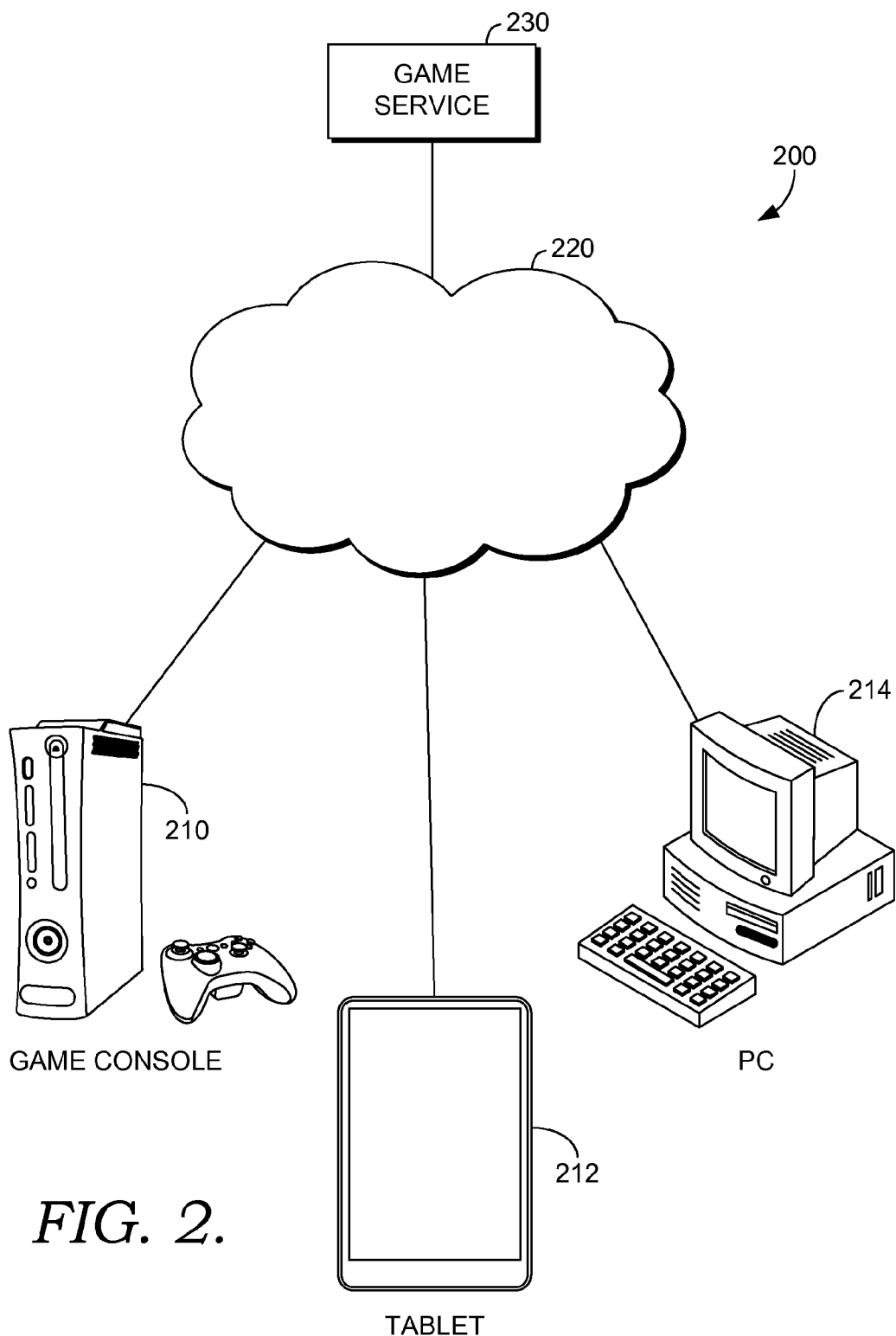
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as a input device for a game console 210 or a personal computer 214. In another embodiment, the tablet 212 is a standalone game client. Network 220 may be a wide area network, such as the Internet.

Game service 230 comprises multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients caries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

Exemplary Game Service for Game Browsing and Instant-On Availability

Figure 3:
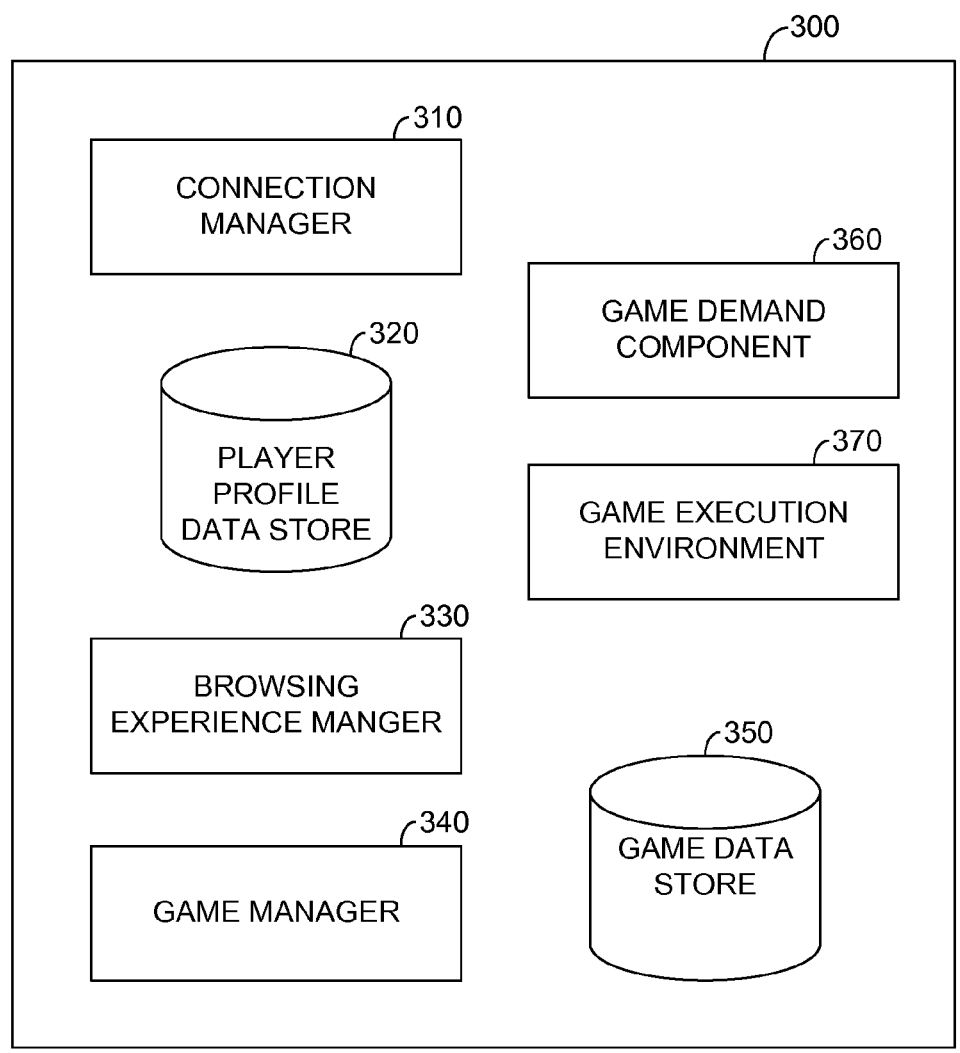
FIG. 3 is a diagram of an game service for game browsing and instant-on availability, in accordance with an embodiment of the present invention.

Turning now to FIG. 3, an exemplary game service 300 for game browsing and instant-on availability is shown, in accordance with an embodiment of the present invention. It will be understood and appreciated by those of ordinary skill in the art that the computing environment shown in FIG. 2 is merely an example of one suitable computing environment and is not intended to suggest any limitation as to the scope of the use or functionality of the present invention. Neither should the computing environment be interpreted as having any dependency or requirement related to any single component/module or combination of component/modules illustrated therein. The game service 300 may be similar to the game service 230 described previously with reference to FIG. 2. The game service 300 comprises a connection manager 310, a player profile data store 320, a browsing experience manager 330, a game manager 340, a game data store 350, a game demand component 360, and a game execution environment 370.

The connection manager 310 manages connections between the game service 300 and various game clients that connect to the game service. The connection manager 310 may set up and authorize communication sessions between the game service 300 and the game clients. In addition, the connection manager 310 may authenticate the player and grant access to some or all of the experiences provided by the game service 300. The connection manager 310 may perform various security and encryption functions. For example, the connection manager 310 may manage passwords and player names for authorized players. The connection manager 310 may also route players to server farms in geographic proximity to the player's location. The location of the player may be identified through an IP address or other mechanism, including a player profile. Throughout this description, the terms player and players are used interchangeably.

The player profile data store 320 may work in conjunction with the connection manager 310 to build and store player information. Part of the player profile may comprise demographic and financial information such as a player's name, address and credit card information or other mechanism for paying for or purchasing games and experiences provided by the game service 300. In addition, the player profile data store 320 may store a player's progress within an individual game. As a player progresses through a game, the player's score and access to game levels may be stored. Further, the player profile data store 320 may comprise information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency through their location.

The player profile data store 320 may also store a usage history for the individual player. A player's history of purchasing games, sampling games, or playing games through a game service that does not require the purchase of the games may be tracked and stored. This usage information may be used to suggest games to an individual player that may interest them. In one embodiment, the purchase history may include games that are not purchased through the game service. For example, the purchase history may be augmented by the player entering in a key from a game purchased in a retail store. In some embodiments, the player may then have access to that game both on their game client and through the game service when they are no longer at their game client.

The browsing experience manager 330 enables a browsing function for the player. Though described as a browsing interface, the interface may also provide instant-on access to a game. Instant-on access is a single instance of selecting a game, while browsing may repeat the instant-on process to allow the use to switch between games or game levels. The browsing function allows the player to surf directly into various games. As has been explained briefly and will be explained in more detail subsequently, the player may select a game and be dropped into a running instance of the game at a playable state. This allows the player to immediately play a selected game. As used herein, "playable" means able to manipulate game characters and objects within the selected game. Playable does not mean showing a preview video or some other preview function that is less than the main part of the game.

The browsing experience manager 330 generates a browsing interface through which a player may select games. The browsing interface may be generated by the gaming server and communicated to the game client. In another embodiment, a browsing application is downloaded to the game client and browsing data is communicated to the application. Embodiments of the present invention are not limited by how the browsing interface is generated on the client. The browsing interface provides a player with a mechanism for selecting games that are available through the game service. The browsing interface may allow the player to select games by category. Further, the browsing interface may segregate games based on games that the player has full access to, such as those that have been purchased or are part of a gaming plan, and those which can be previewed and purchased in the future, or may be part of an expanded gaming package. In one embodiment, the player's gaming history and preferences may be used to show games that the player is most likely to be interested in playing. The player may be able to explicitly select favorites. The browsing interface may also provide various gaming utility functions, such as the ability to pause a game, save a game, and set player preferences.

In one embodiment, the browsing interface may be displayed in several different states. For example, there may be a full state through which the player can access preferences and other utilities. There may be a lighter state, which takes up less display area, through which the player may be shown game previews and select games. Further, there may be a minimized state that takes up little or, in some cases, no display space. For example, the browsing interface may be minimized to an icon visible in the overall gaming experience. In another embodiment, the minimized browsing interface is surfaced upon an explicit command by the player and no icon is shown. In another embodiment, the browsing interface may be closed when a game is selected and pushing the menu button or some other function will surface the browsing interface to allow the player to make another selection.

When browsing between games, the player's progress is saved. For example, the player could select a first game and be dropped into it. Once the player plays for a few minutes and advances through a level or earns other achievements, the player may simply browse into a second game into which the player is immediately dropped and the progress in the first game is automatically saved. The player does not have to explicitly request that the progress be saved. As mentioned previously, the game progress may be updated within the player profile data store 320. In this way, the player can quickly navigate between games without having to save a game or specify a progress point to start the game. The game can just pick up where the player left off.

The game manager 340 manages players' connections into active games and maintains inactive games in a running state that are ready for the player. The inactive games may be described as preloaded into an active state in active memory. In one embodiment, there are individual game managers for each game available through the game service. Taking a single game as an example, the game manager will preload a designated number of games, perhaps as determined by the game demand component 360, that are ready for a player to be dropped into for immediate play. The game manager 340 also manages active games. In one embodiment, a player may connect to a game through the game manager 340. In other words, the game manager 340 may act as a gatekeeper for communications and connections between individual game instances. When a player drops out of a game, an instruction may go to the game manager to retrieve and save the player's progress into the player's profile within player profile data store 320. Once a player drops out of a game, the game may be shut down by the game manager 340 and a new preloaded game may be activated in place of the closed game.

The game data store 350 stores available games. The games may be retrieved from the data store and activated through an active memory. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game demand component 360 analyzes the usage data to determine, among other things, how many preloaded instances of a particular game should be available. In general, games with a high demand will have more preloaded instances of a game available. Preloading a game into active memory may take a minute or two; thus, games with high churn in and out may also require more preloaded instances of games to be available. The amount of time it takes to preload a game into active memory may also be considered. Games that load comparatively quickly may require less in active memory because additional games can be added to active memory more quickly as demand changes and as players select the game. In other words, games with a slower load time require more available games.

The game demand component 360 may also provide information used by game manager 340 or other components to allocate server resources to a particular game. Server resources allocated to a particular game include the resources needed to execute and for players to play however many game instances that are active as well as the preloaded game instances that have no player connected. As demand for various game changes over time, the allocation of resources to games can be adjusted. Further, historical usage data may be utilized to anticipate changes. For example, if a first game is played more heavily between 10:00 p.m. and midnight than a second game that is played more heavily during the day then resources may be switched between the second and first game for the 10:00 p.m. to midnight period.

The game demand component 360 may provide different allocations of preloaded games and projected overall game usage to different server farms based on the demographics of the players likely to be served by the server farm. For example, if a particular game is popular in the Northwest of the United States, then more resources may be allocated to that game within server farms located in the Northwest. On the other hand, games that are more popular in the Southeast may have comparatively more resources allocated to running those games within server farms located in the Southeast.

The game demand component 360 may provide the game demand information to the game manager as well as the browsing experience manager 330. In one embodiment, when the resources allocated to a particular game are maxed out so that a player is not able, on a temporary basis, to drop in immediately to the game, the browsing experience manager 330 is notified and that game is temporarily removed from the browsing interface. This prevents a player from selecting a game and having a delay before playing. Once the new games have been added by the game manager 340, then a new notification is sent and that game is added to the list of games available through the browsing interface. The availability analysis may be very granular based on the server farm to which a player is currently connected. In another embodiment, the demand and usage across the entire game service and all server farms that comprise the game service is evaluated and upon selecting a game, a player may be transitioned to a different server farm that has availability to play that game. The transition may be handled by connection manager 310.

The game execution environment 370 comprises the gaming resources required to execute instances of a game. These are the resources described previously that are managed by the game manager 340 and other components. The game execution environment 370 comprises active memory along with computing and video processing. The game execution environment 370 receives gaming controls through an I/O channel and causes the game to be manipulated and progressed according to its programming. In one embodiment, the game execution environment 370 outputs a rendered video stream that is communicated to the game client. In other embodiments, the game execution environment 370 outputs game geometry, or other representations, which may be combined with local objects on the gaming client to render the gaming video.

Figure 4:
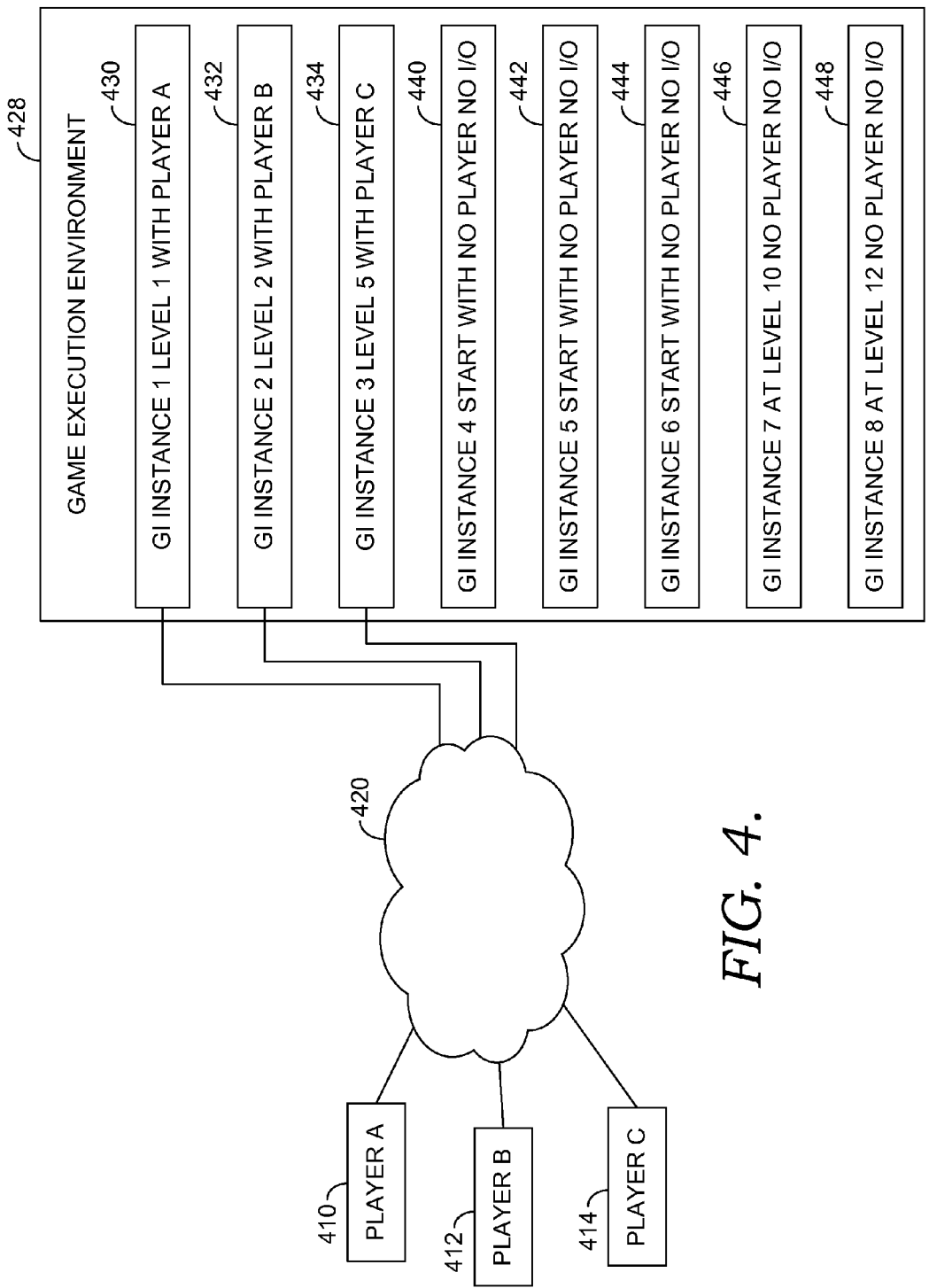
FIG. 4 is a diagram of a game execution environment that is running active game instances with players connected and preloaded active game instances without players connected, in accordance with an embodiment of the present invention.

Turning now to FIG. 4, a game execution environment 428 that is running active game instances with players connected and preloaded active game instances without players connected, is illustrated in an accordance with an embodiment of the present invention. The game execution environment 428 may be similar to the game execution environment 370 described previously. The game execution environment 428 may be part of a game service such as described previously with reference to FIGS. 2 and 3. For the sake of simplicity, other components within the game service are not shown. The game execution environment 428 is connected to various game clients through network 420. As mentioned previously, other components such as authorization and connection management components and game managers may route communications between the network 420 and the game execution environment 428.

As can be seen, player A on client device 410, player B on client device 412, and player C on client device 414 are connected to the game execution environment 428. Specifically, player A is connected to game instance one 430 at level one. Game instance two 432 is connected with player B and is at level two. Game instance three 434 is at level five and is connected with player C. As mentioned previously, when players are connected, their player profile information and other I/O channel details may be incorporated into the active game to allow them to actually play the game.

Several active game instances are running within the game execution environment 428 but do not have players connected. In each case, there is no player and no I/O channel associated with the actively running game. Game instance four 440 is actively running and waiting at the start of the game. Game instance five 442 is similarly waiting without a player and waiting at the start of the game. Game instance six 444 is also waiting at the start of the game. Game instance seven 446 is actively running at level ten. This means that a player that is dropped into the game instance seven 446 would be immediately able to play level ten of the game.

Some games are very large and only portions of such games are held in the active memory. Having active instances of games at different levels may allow a player to browse directly from level to level without having to wait for the new level to load into the active memory. Game instance eight 448 is preloaded and actively running at level twelve with no player and no I/O connection.

Figure 5:
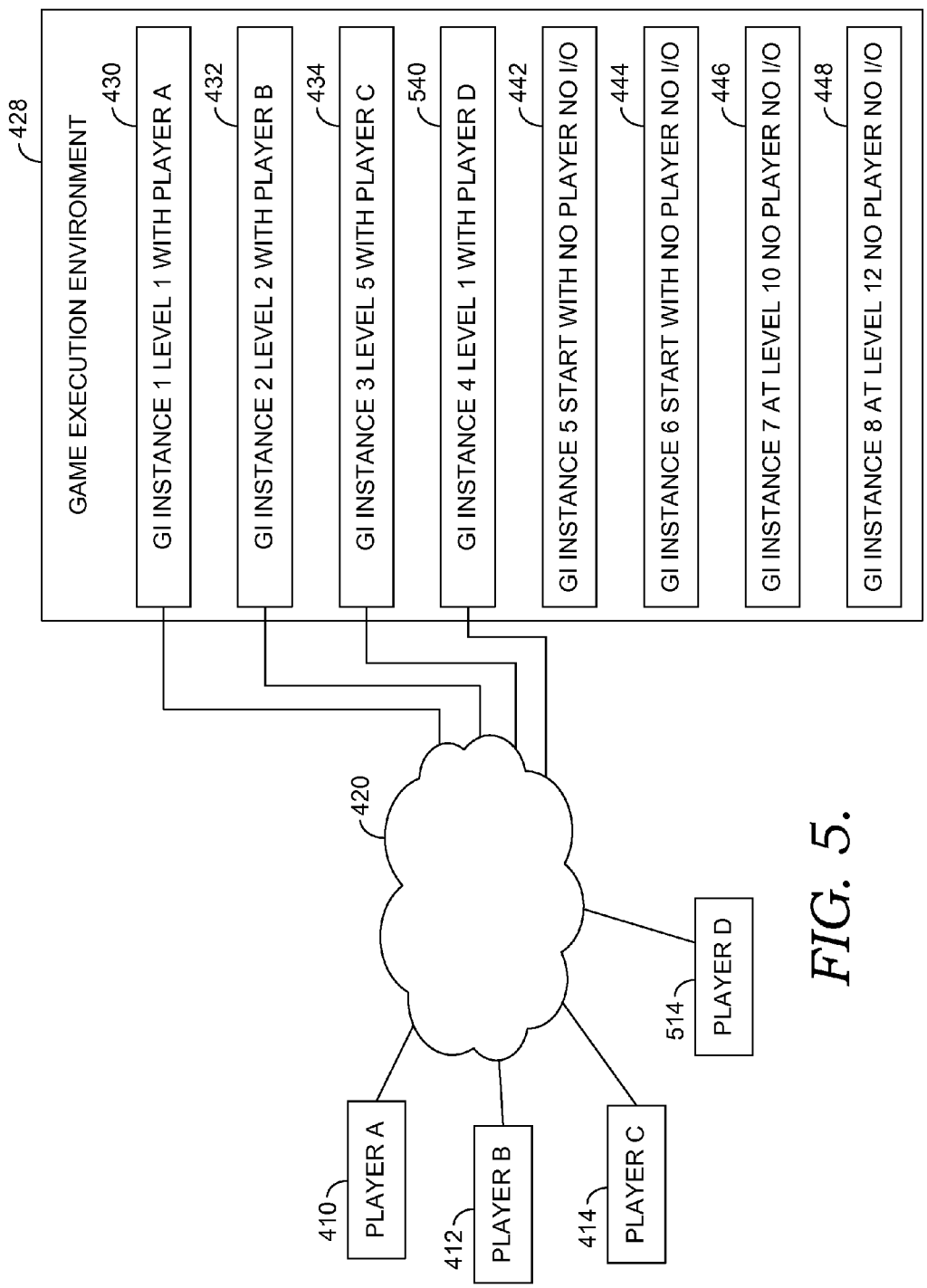
FIG. 5 is a diagram that illustrates adding a new player within a game execution environment that is running active game instances with players connected and preloaded active game instances without players connected, in accordance with an embodiment of the present invention.

Turning now to FIG. 5, the addition of a new player, player D 514, to the game execution environment 428 is illustrated, in accordance with an embodiment of the present invention. As can be seen, most features of FIG. 5 are similar to those described previously with reference to FIG. 4. Players A, B and C are all connected to the same game instance they were previously connected to. In this case, player D on client device 514 has been dropped into what was previously game instance four 440. In FIG. 5 this game instance is shown as game instance 540 with player D connected. Now that a player has been dropped into one of the preloaded game instances, a new instance of the preloaded game (not shown) may be activated by a game manager or other component to maintain the same number of standby games.

Figure 6:
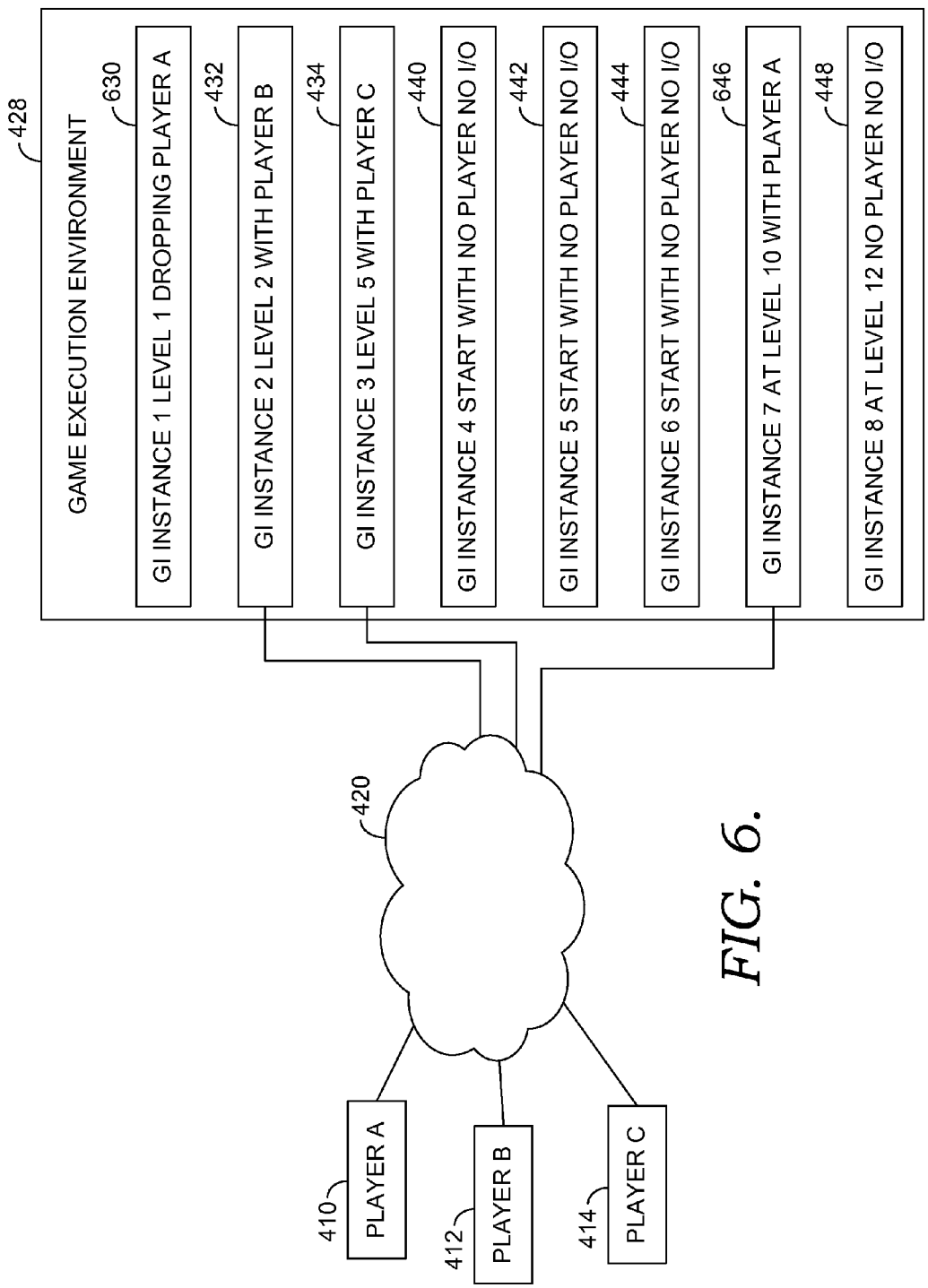
FIG. 6 is a diagram that illustrates moving a player from one level to second level within a game execution environment that is running active game instances with players connected and preloaded active game instances without players connected, in accordance with an embodiment of the present invention.

Turning now to FIG. 6, a player browsing between different levels of a game is illustrated, in accordance with an embodiment of the present invention. In FIG. 6, player A is moved from level one of game one into level ten of game one by changing game instances. The player may have requested a new level through a selection on a browsing interface displayed at the player's game client 410. The browsing interface may show different games to play as well as different levels of individual games for the player to select.

Once the request to change levels is received, player A is connected to a preloaded active instance of game one running at the requested level. In this case, the player was added to instance seven 446, which was preloaded to run at level ten. The modified game instance 646, shown with player A connected, illustrates that player A has been connected to level ten in a new game instance. Once connected, the player is able to play at level ten without delay. Without delay may mean less than two seconds from making the request. Updated game instance one 630 indicates that the player is being dropped. As part of the dropping process, the player's I/O channel is removed and may be transferred to game instance seven 646 and the player's progress may be saved.

Once a player has been removed from an active game instance, the game instance may be reset to its default position waiting for a new player, for example at the start of the game, or may be torn down completely. If torn down, a new instance of the game may be spun up or activated at the default level, such as at the start of the game. Once the player browses into level ten, a new preloaded instance of game one at level ten may be preloaded into active memory. This instance is not shown in FIG. 6.

In one embodiment, the determination of whether or not to make game instances available at different levels is determined based on the size and complexity of the game and different game levels. The longer it takes to switch between levels, as a result of the level size, the more game instances may be made available at different levels. For example, if by default the first nine levels are loaded into active memory and the game is twenty levels long, then game instances starting at level ten may be on standby. If an entire game is loaded into active memory and levels are easy to switch between then preloaded game instances may just wait at the start. In one embodiment, historical usage data showing what level people start at, is used to determine what level preloaded game instances should wait at.

Figure 7:
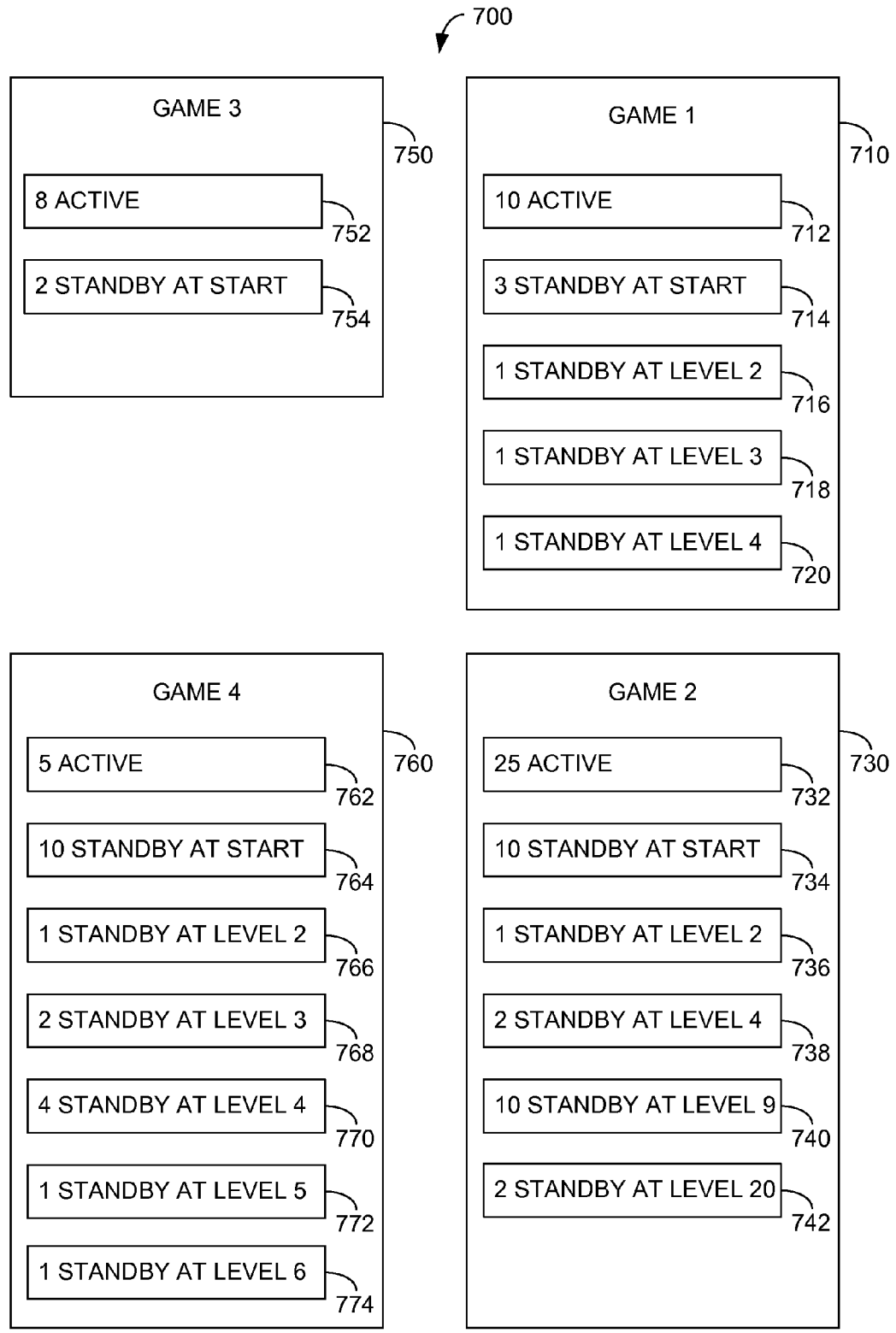
FIG. 7 is a diagram illustrating resource allocation within a game execution environment that is running active game instances with players connected and preloaded active game instances without players connected, in accordance with an embodiment of the present invention.

Turning now to FIG. 7, the management of gaming resources within the gaming environment 700 is illustrated, in accordance with an embodiment of the present invention. The gaming environment 700 may be similar to the gaming environments described previously. In this case, resources are allocated to four different games. Only four games are shown for the sake of simplicity. As mentioned, the resources may include servers, portions of servers or other portions of resources that are allocated to a particular game.

In FIG. 7, game one 710 is allocated a certain number of resources that allows it to run ten active games 712, three inactive games instances standing by at the start 714, one standing by at level two 716, one standing by at level three 718, and one standing by at level four 720. Game two 730 has the resources necessary to run 25 active games 732, have ten standing by at the start 734, have one standing by at level two 736, have two standing by at level four 738, have ten standing by at level nine 740, and two standing by at level twenty 742.

Game three 750 has the resources available to have eight active games 752 and two on standby 754. Game four 760 may have the resources allocated to run five active games 762, ten standing by at start 764, one standing by at level two 766, two standing by at level three 768, four standing by at level four 770, one standing by at level five 772, and one standing by at level six 774.

The allocation shown in FIG. 7 may be guided by a demand analysis that takes into account both current usage and historical usage. The demand analysis may start with historical usage to determine the number of active games and standby games that should be expected for a particular game. However, when the actual usage deviates beyond a threshold amount from the anticipated usage, the resources allocated to run instances of various games may be reallocated to other games that have experienced greater than the anticipated amount of usage. This adjustment is shown in FIG. 8.

Figure 8:
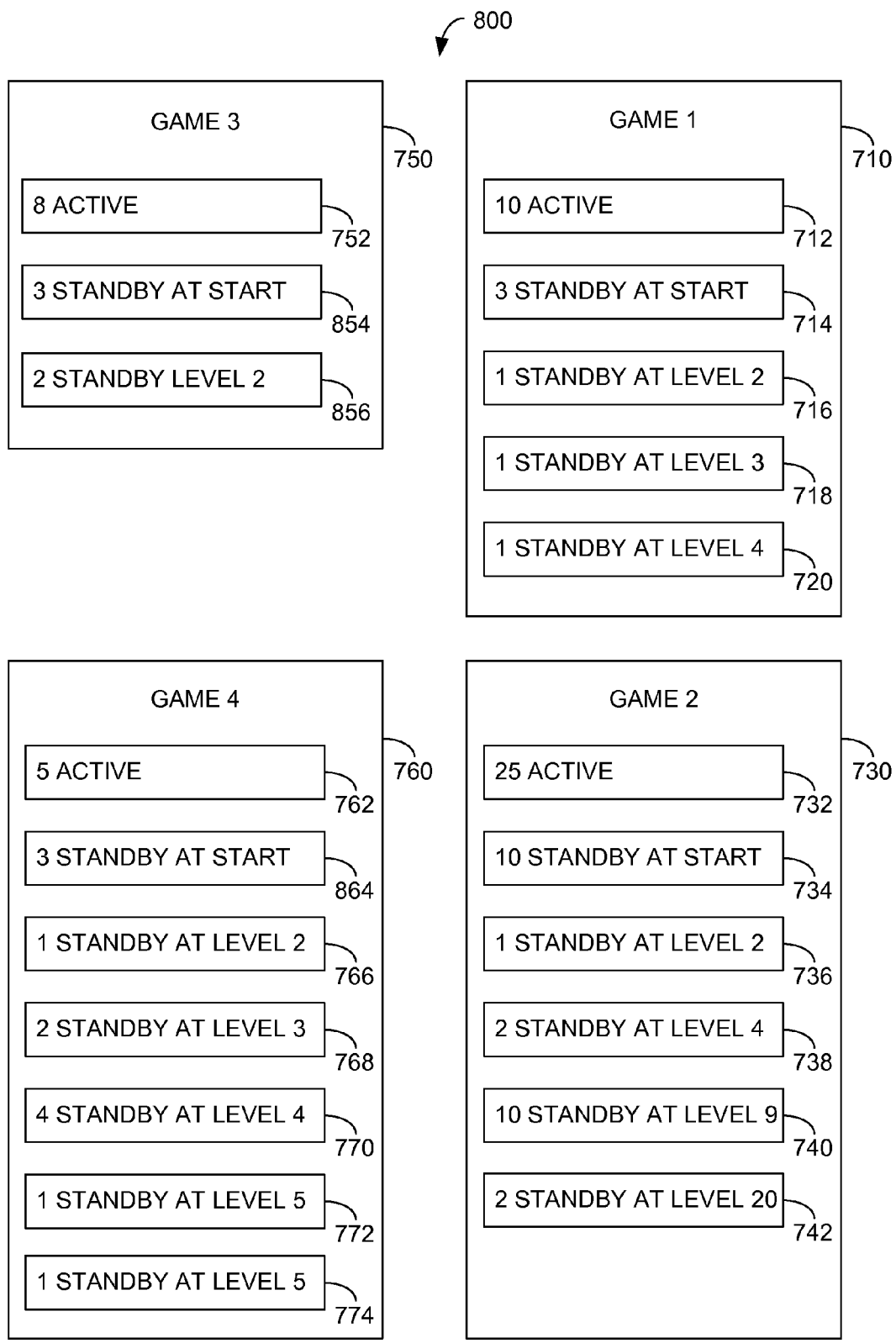
FIG. 8 is a diagram illustrating updated resource allocation within game execution environment that is running active game instances with players connected and preloaded active game instances without players connected, in accordance with an embodiment of the present invention.

Turning now to FIG. 8, an adjusted resource allocation 800 is shown, in accordance with an embodiment of the present invention. In this case, resources allocated to run instances of game four 760 have been reallocated to run instances of game three 750. In particular, game three now has the resources to run three games on standby at the start 854 and two standing by at level two 856. The resources allocated to game four 760 have been reduced so that there are only three instances on standby at the start 864.

Instant-On and Game Browsing Methods

Figure 9:
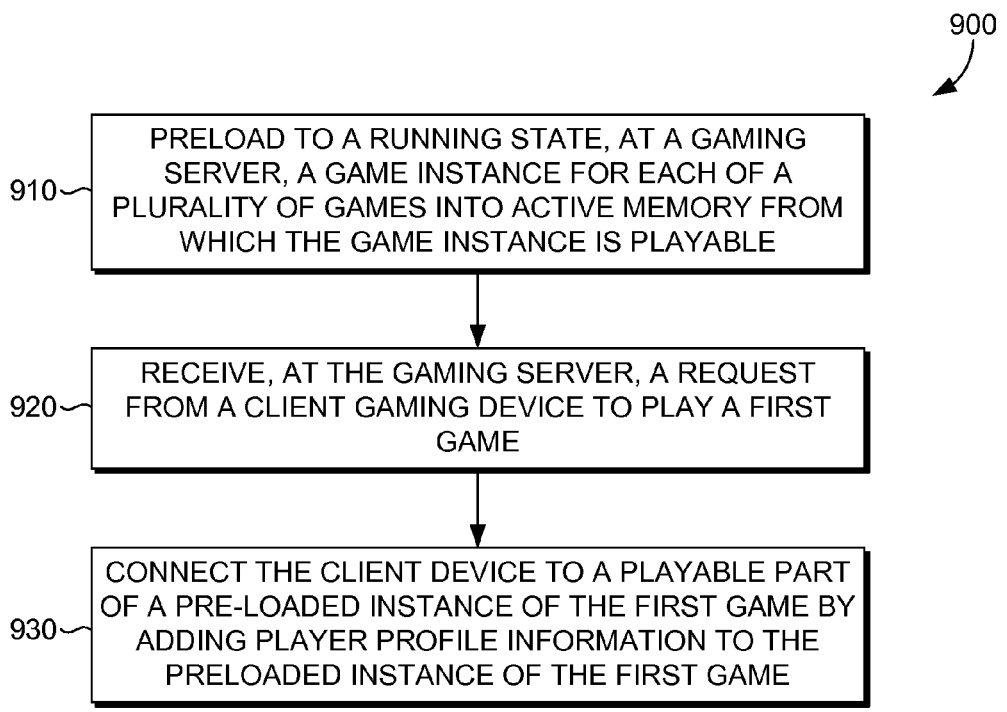
FIG. 9 is a flow chart showing browsing between game play of multiple games, in accordance with an embodiment of the present invention.

Turning now to FIG. 9, a method 900 of browsing between game play of multiple games is shown, in accordance with an embodiment of the present invention. As mentioned previously, the browsing requests may be made through an interface displayed on a gaming client. The interface may be generated by a game service or on an application running on a gaming client.

At step 910, a game instance for each of a plurality of games is preloaded to a running state with an active memory on a game server, from which the game instance is playable on a game client. As mentioned previously, the game client may connect to the game server over a network. Various authentication procedures may be used before allowing the game client to connect with the game server. Further, the game client may be operated by a player that is associated with a player profile. The player profile may be associated with the game client for a particular gaming session. As mentioned previously, in a running state, the game objects in active memory are accessible and manipulable by a processing device that executes the game. Active memory contrasts with secondary memory in which game objects may be stored passively while they are not manipulable in a game action.

Subsequent to the preloading, at step 920, a request from a game client to play a first game is received at the gaming server. As mentioned, the request may be generated through a game browsing interface. The game request is received after a game instance has been preloaded and is ready for a player.

At step 930, the game client is connected to a playable part of a preloaded instance of the first game by adding player profile information to the preloaded instance of the first game. The preloaded instance of the first game is one of the preloaded game instances described within step 910. In one embodiment, the player profile information comprises player preferences and progress for the first game. Adding profile information allows the player to start the first game based on previous progress. The player profile information may also comprise a language preference in which case a language package is accessed and added to the preloaded instance of the first game as part of adding the player profile information. In addition, an input output channel between the game client and the instance of the first game is established. This allows the player to manipulate the first game through a controller that is either part of the game client or connected to the game client. Because the player profile may include game progress, the player may be dropped into the game and moved immediately to the middle part of a particular level or portion of a game indicted in the game progress.

As mentioned previously, the number of game instances loaded at step 910 may be determined by generating an anticipated demand for the plurality of games by analyzing historical game play information. Historical demand may be used to specify the amount of games of each game instance for each game that is uploaded in addition to the levels at which they may be waiting. In addition to historical demand, the anticipated demand may be adjusted through event awareness. For example, the demand for a newly released game may be set based on use of previous version of the game or similar games when no historical usage data is available. In another case, demand for a football video game may be increased to coincide the start of football season.

In embodiments of the present invention, a request from the client to join a second game may be received while the player is still playing the first game. At this point, any progress made in the first game may be recorded in the player's player profile and they may be connected to a playable part of a preloaded instance of the second game. Again, the player profile information may be added to the preloaded instance of the second game to allow the player to play the second game.

Figure 10:
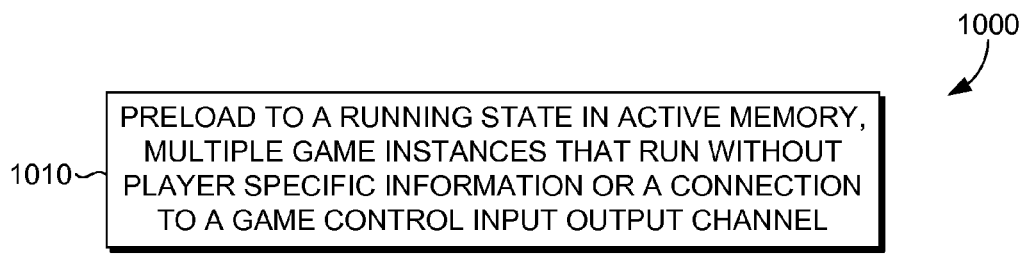
FIG. 10 is a flow chart showing instant on-game browsing within a game service, in accordance with an embodiment of the present invention.

Turning now to FIG. 10, a method 1000 of instant on game availability within a game service is shown, in accordance with an embodiment of the present invention. At step 1010, multiple game instances are preloaded to a running state in active memory without player-specific information or a connection to a game control I/O channel. In other words, the game instances are running in active memory and are ready to be played once an I/O channel from a game client is added and player-specific information is added. Preloaded information may include all game objects needed to play at least a portion of a game, for example the first few levels, except the player-specific information and the I/O channel connection. Different amounts of game instances for different games may be loaded based on anticipated demand for individual games. Once the games are preloaded, a request from a game client may be received. Subsequent to receiving the request, the gaming client may be connected to one of the preloaded instances of the game. In another embodiment, the request is received from a game client to play a particular level of a preloaded game and they are added to a preloaded instance of a game running at that level.

Figure 11:
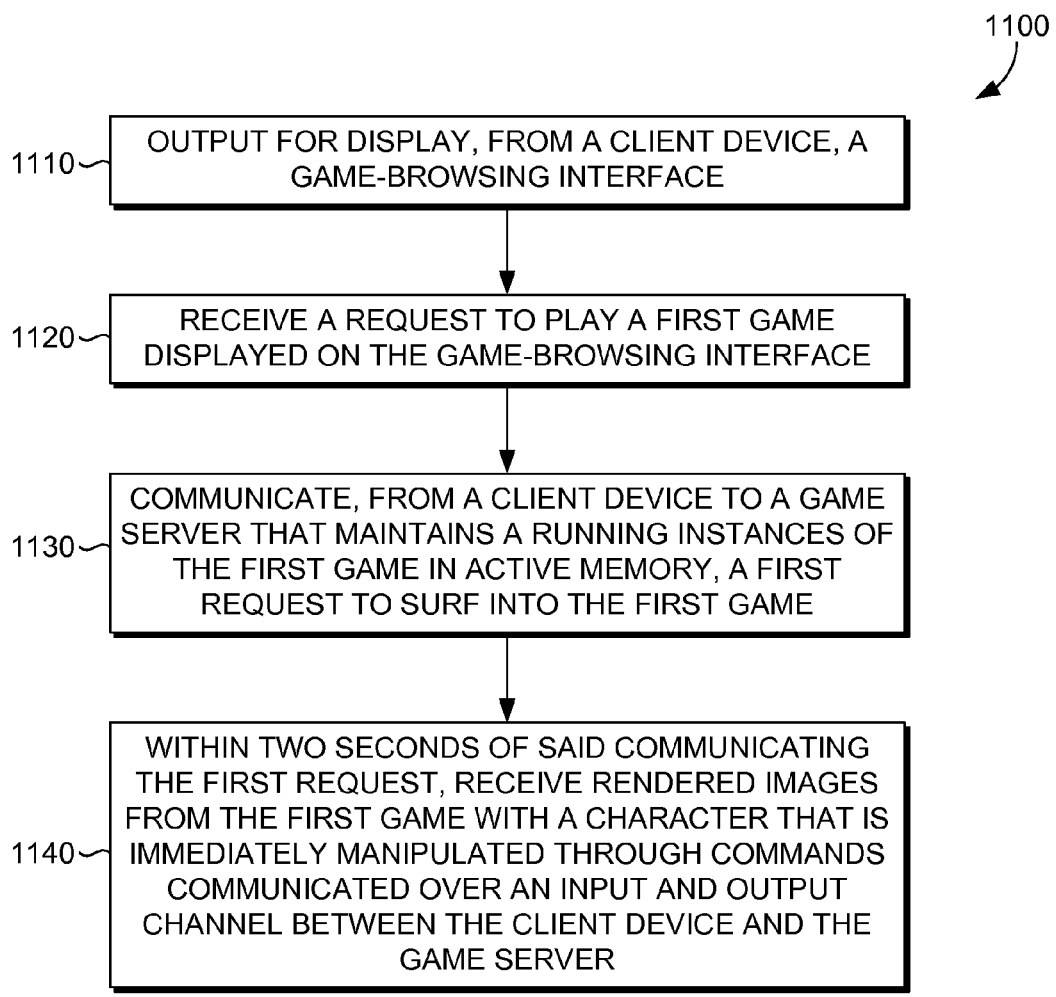
FIG. 11 is a flow chart showing browsing between game play of multiple games, in accordance with an embodiment of the present invention.

Turning now to FIG. 11, a method 1100 of browsing between game play of multiple games is shown, in accordance with an embodiment of the present invention. At step 1110, a game-browsing interface is output for display on a game client. As mentioned previously, the game-browsing interface may be generated by an application running on a game client and connected via network to a game service or the browsing interface may be generated by the game service and downloaded to a gaming client.

At step 1120, a request to play a first game displayed on the game-browsing interface is received. At step 1130, a first request to surf into the first game is communicated from the game client to a game server that maintains a running instance of the first game in active memory. At step 1140, within two seconds of communicating the first request, receiving rendered images from the first game with a character that is immediately manipulated through commands communicated over an I/O channel between the first device and the game server is received. Once received, the player is immediately able to play the game at the requested level. In one embodiment, while play is ongoing in the first game, a request to play a second game displayed on a game browsing interface is received at the client device. A second request is then communicated from the game client to the game server to surf into the second game. Within two seconds, the players are able to manipulate characters within the second game through their game client. In other words, within two seconds, the player is dropped into the new game at a point where they are able to play it. Similarly, in another embodiment, the player is able to surf or browse into a different level of the game they are currently playing without waiting for that portion of the game to be voted into active memory because they are dropped into a preloaded game instance waiting at that level.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer-executable instructions embodied thereon that when executed by a computing device perform a method of browsing between game play of multiple games, the method comprising:
   preloading a game instance for each of a plurality of games to a running state within active memory on a game server, from which the game instance is playable on a game client,
   subsequent to said preloading, receiving, at the game server, a first request from the game client to play a first game; and
   connecting the game client to a playable part of a preloaded instance of the first game by adding player profile information to the preloaded instance of the first game, wherein the player profile information comprises player preferences and progress for the first game.

2. The media of claim 1, wherein the player profile information includes a language package that specifies in which language game features are presented.

3. The media of claim 1, wherein connecting further comprises adding an input and output channel for game controls to the preloaded instance of the first game.

4. The media of claim 1, wherein the playable part is a middle part of a level of the first game.

5. The media of claim 1, wherein the method further comprises outputting a game-browsing interface through which games within the plurality of games is selectable.

6. The media of claim 1, wherein the method further comprises determining an anticipated demand for the plurality of games by analyzing historical game-play information and preloading multiple game instances to a running point of at least one of the games to accommodate the anticipated demand.

7. The media of claim 1, wherein the method further comprises:
   receiving a second request from the game client to join a second game;
   recording any progress made in the first game to the player profile information; and
   connecting the game client to a playable part of a preloaded instance of the second game by the adding player profile information to the preloaded instance of the second game.

8. A method of instant on-game availability within a game service comprising:
   preloading, on one or more game servers within a data center, multiple game instances, which run without player specific information or a connection to a game-control I/O channel, to a running state in active memory;
   subsequent to said preloading, receiving a first request from a game client to play a first game;
   connecting the game client to a playable part of a first level within a preloaded instance of the first game on the one or more game servers within the data center;
   subsequent to said connecting, receiving a request from the game client to purchase the first game; and
   outputting the first game for download to the game client.

9. The method of claim 8, wherein a preloaded game instance includes all game objects needed to play at least a portion of a game, except the player profile information and the connection.

10. The method of claim 8, wherein the multiple game instances are for multiple games and different amounts of game instances are preloaded based on anticipated demand for individual games.

11. The method of claim 10, wherein the anticipated demand is calculated for each server farm providing the game service.

12. The method of claim 9, wherein the player profile information includes a language package that specifies in which language game features are presented.

13. The method of claim 9,
   wherein the player profile information comprises player preferences and progress for the first game.

14. The method of claim 13, wherein the method further comprises:
   receiving a second request from the game client to play a second level of the first game; and
   connecting the game client to a playable part of the second level within a different preloaded instance of the first game.

15. The method of claim 8,
   wherein the playable part is a middle part of a level of the first game.

16. The method of claim 8, wherein the method further comprises determining an anticipated demand for a plurality of games by analyzing historical game-play information and selecting the multiple game instances based on the anticipated demand.

17. One or more computer-storage media having computer-executable instructions embodied thereon that when executed by a computing device perform a method of browsing between game play of multiple games, the method comprising:
   outputting for display, from a game client, a game-browsing interface;
   receiving a first request to play a first game displayed on the game-browsing interface;
   communicating, from the game client to a game server that maintains a running instances of the first game in active memory, the first request to surf into the first game;
   within two seconds of said communicating the first request, receiving rendered images from the first game with a character that is immediately manipulated through commands communicated over an input and output channel between the game client and the game server; and subsequent to said receiving the first request, outputting a purchase request for the first game.

18. The media of claim 17, wherein the method further comprises:
    while play is ongoing in the first game, receiving a second request to play a second game displayed on the game-browsing interface;
    communicating, from the game client to a game server that maintains the running instances of the second game in active memory, the second request to surf into the second game; and
    within two seconds of said communicating the second request, receiving rendered images from the second game with a character that is immediately manipulated through commands communicated over the input and output channel between the game client and the game server.

19. The media of claim 17, where in the method further comprises:
    while play is ongoing in the first game, receiving a second request to play a new level of the first game displayed on the game-browsing interface;
    communicating, from the game client to a game server that maintains the running instances of the first game at the new level in active memory, the second request to surf into the new level of the first game; and
    within two seconds of said communicating the second request, receiving rendered images from the new level of the first game with a character that is immediately manipulated through commands communicated over the input and output channel between the game client and the game server.

20. The media of claim 17, wherein the method further comprises subsequent to said receiving, receiving a request through the game-browsing interface to purchase the first game.

* * * * *